(12) United States Patent
Kato et al.

(10) Patent No.: US 10,800,404 B2
(45) Date of Patent: Oct. 13, 2020

(54) VEHICLE TRAVELING ASSISTANCE APPARATUS

(71) Applicant: AISIN SEIKI KABUSHIKI KAISHA, Kariya-shi, Aichi-ken (JP)

(72) Inventors: Masaya Kato, Susono (JP); Motokatsu Tomozawa, Susono (JP); Yusuke Kiyokawa, Toyota (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 158 days.

(21) Appl. No.: 15/919,447

(22) Filed: Mar. 13, 2018

(65) Prior Publication Data

US 2018/0273028 A1    Sep. 27, 2018

(30) Foreign Application Priority Data

Mar. 23, 2017   (JP) .................................. 2017-057544

(51) Int. Cl.
| | |
|---|---|
| *B60W 30/06* | (2006.01) |
| *G05D 1/02* | (2020.01) |
| *B62D 6/00* | (2006.01) |
| *B62D 15/02* | (2006.01) |

(52) U.S. Cl.
CPC ............ *B60W 30/06* (2013.01); *B62D 6/002* (2013.01); *B62D 15/0285* (2013.01); *G05D 1/0212* (2013.01); *G05D 1/0246* (2013.01)

(58) Field of Classification Search
CPC .... B60W 30/06; B60W 30/09; B60W 30/095; H04W 4/80; G05D 1/0212; G05D 1/0246; G05D 2201/0213; G08G 1/16; G08G 1/165; G08G 1/168; B62D 6/002
See application file for complete search history.

(56) References Cited

U.S. PATENT DOCUMENTS

| | | | |
|---|---|---|---|
| 7,103,461 B2 | 9/2006 | Iwazaki et al. | |
| 7,233,851 B2* | 6/2007 | Iwazaki | ............ B62D 15/0285 |
| | | | 701/23 |
| 7,487,020 B2* | 2/2009 | Iwazaki | ............ B62D 15/0285 |
| | | | 180/204 |

(Continued)

FOREIGN PATENT DOCUMENTS

| | | |
|---|---|---|
| DE | 102005037468 A1 | 2/2007 |
| DE | 102008058652 A1 | 5/2010 |

(Continued)

OTHER PUBLICATIONS

Schoenherr, Niemz, Machine Translation of DE102009027289 (A1), "Method and Device for Providing Assistance for Parking a Vehicle" (Year: 2010).*

(Continued)

*Primary Examiner* — Anne Marie Antonucci
*Assistant Examiner* — Sahar Motazedi
(74) *Attorney, Agent, or Firm* — Sughrue Mion, PLLC

(57) ABSTRACT

A vehicle traveling assistance apparatus includes: a creation unit configured to create a first route, which is a route along which a vehicle moves from a first position to a second position and in which the vehicle stops to perform stationary steering in a middle of the route and then moves to the second position; and a controller configured to cause the vehicle to travel along the created first route.

10 Claims, 8 Drawing Sheets

(56) References Cited

U.S. PATENT DOCUMENTS

| | | | |
|---|---|---|---|
| 2003/0150661 A1* | 8/2003 | Kataoka | B60Q 9/004 |
| | | | 180/204 |
| 2009/0278709 A1* | 11/2009 | Endo | B62D 15/027 |
| | | | 340/932.2 |
| 2010/0156671 A1 | 6/2010 | Lee et al. | |
| 2011/0087406 A1* | 4/2011 | Barth | B62D 15/027 |
| | | | 701/41 |
| 2013/0054128 A1* | 2/2013 | Moshchuk | G08G 1/167 |
| | | | 701/301 |
| 2013/0085637 A1* | 4/2013 | Grimm | B60W 30/06 |
| | | | 701/25 |
| 2015/0367845 A1* | 12/2015 | Sannodo | B60W 30/06 |
| | | | 701/23 |
| 2016/0075375 A1* | 3/2016 | Yamashita | B62D 15/028 |
| | | | 701/41 |
| 2016/0075377 A1* | 3/2016 | Tomozawa | B62D 15/028 |
| | | | 701/41 |
| 2016/0159397 A1* | 6/2016 | Baek | B62D 15/0285 |
| | | | 701/41 |
| 2017/0129486 A1* | 5/2017 | Nakada | B60W 30/06 |
| 2018/0162446 A1* | 6/2018 | Mikuriya | B60R 21/00 |
| 2019/0027042 A1* | 1/2019 | Fujishima | B60R 21/00 |
| 2019/0084561 A1* | 3/2019 | Takeda | B60W 30/095 |

FOREIGN PATENT DOCUMENTS

| | | | | |
|---|---|---|---|---|
| DE | 102009027289 A1 * | 11/2010 | | B62D 15/028 |
| JP | 04-160609 A | 6/1992 | | |
| JP | 3818654 B2 | 9/2006 | | |
| JP | 3911492 B2 | 5/2007 | | |
| JP | 4058389 B2 | 3/2008 | | |
| JP | 2010100086 A * | 5/2010 | | |
| JP | 2011001029 A * | 1/2011 | | |
| JP | 2014034230 A * | 2/2014 | | |

OTHER PUBLICATIONS

Communication dated. Aug. 29, 2018 from the European Patent Office in counterpart application No. 18163702.6.

* cited by examiner

VEHICLE TRAVELING ASSISTANCE APPARATUS

CROSS REFERENCE TO RELATED APPLICATIONS

This application is based on and claims priority under 35 U.S.C. § 119 to Japanese Patent Application 2017-057544, filed on Mar. 23, 2017, the entire contents of which are incorporated herein by reference.

TECHNICAL FIELD

This disclosure relates to a vehicle traveling assistance apparatus.

BACKGROUND DISCUSSION

There is a vehicle traveling assistance apparatus that moves a vehicle to a target position such as a parking position by causing the vehicle to travel along a route including a clothoid curve. See, for example, Japanese Patent Nos. 3911492 (Reference 1), 3818654 (Reference 2), and 4058389 (Reference 3).

However, when causing the vehicle to travel along the route including a clothoid curve in a case of parking the vehicle in a narrow space, the vehicle may go back and forth in order to avoid contact between the vehicle and an obstacle. Thus, the time taken to park the vehicle may be increased, or it may be impossible to park the vehicle with the help of the vehicle traveling assistance apparatus, despite that the vehicle can be parked at a parking position when the vehicle is manually parked.

SUMMARY

In one example, a vehicle traveling assistance apparatus of an embodiment includes a creation unit configured to create a first route, which is a route along which a vehicle moves from a first position to a second position and in which the vehicle stops to perform stationary steering in a middle of the route and then moves to the second position, and a controller configured to cause the vehicle to travel along the created first route.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, exemplary embodiments disclosed here will be described. Configurations of the embodiments described below, and actions, results, and effects caused by the configurations are given by way of example. This disclosure may also be realized by configurations other than the configurations disclosed in the following embodiments, and at least one of various effects and derivative effects based on a basic configuration may be obtained.

First Embodiment

Figure 1:
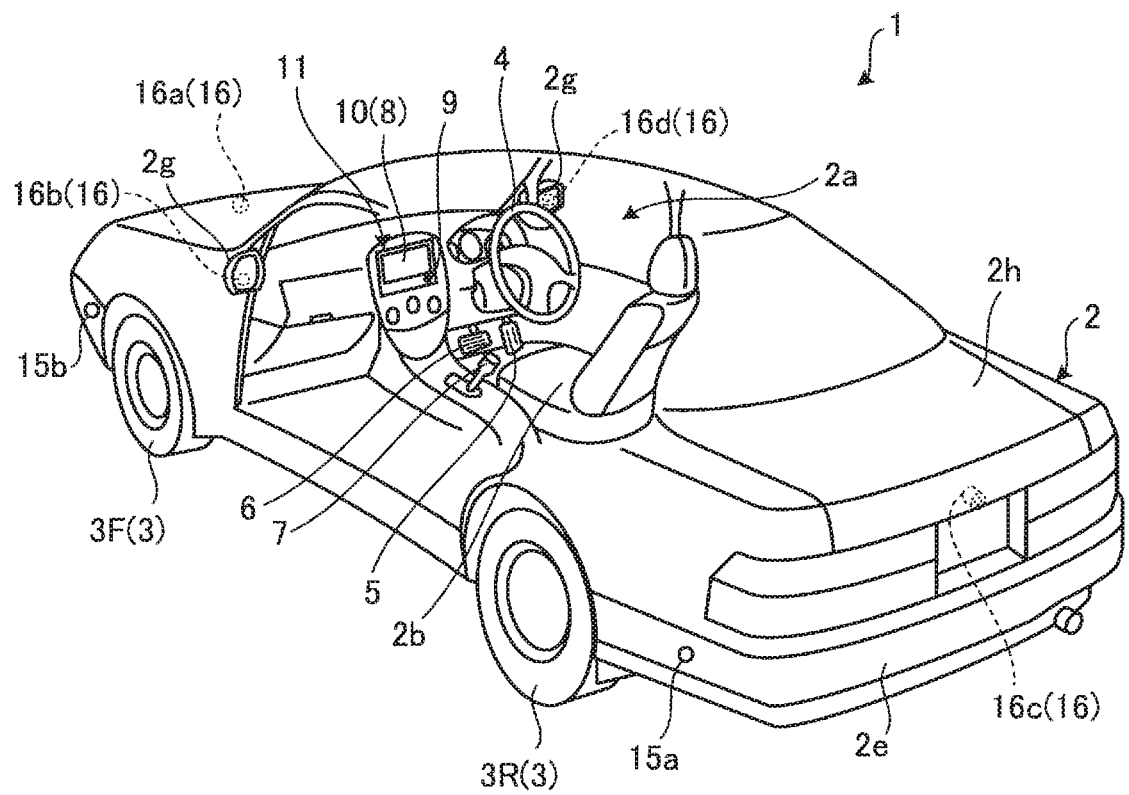
FIG. 1 is a perspective view illustrating an example of a state where a portion of a vehicle room of a vehicle, to which a vehicle traveling assistance apparatus according to a first embodiment is applied, is viewed therethrough.

FIG. 1 is a perspective view illustrating an example of a state where a portion of a vehicle room of a vehicle, to which a vehicle traveling assistance apparatus according to a first embodiment is applied, is viewed therethrough. A vehicle 1 may be an automobile (internal combustion engine automobile) using an internal combustion engine (engine) as a drive source, may be an automobile (e.g., an electric automobile or a fuel cell automobile) using an electric motor (motor) as a drive source, or may be an automobile (hybrid automobile) using both of them as a drive source. In addition, the vehicle 1 may be equipped with various transmission devices and various devices (systems, elements, etc.) required for driving the internal combustion engine or the electric motor. In addition, the type, the number, the layout, and the like of devices associated with the driving of wheels 3 in the vehicle 1 may be set in various ways.

As illustrated in FIG. 1, the vehicle 1 includes a vehicle body 2, a steering unit 4, an acceleration operation unit 5, a braking operation unit 6, a transmission operation unit 7, and a monitor device 11.

The vehicle 2 includes a vehicle room 2a in which an occupant of the vehicle body 1 rides. In the vehicle room 2a, the steering unit 4, the acceleration operation unit 5, the braking operation unit 6, the transmission operation unit 7, a display device 8, a sound output device 9, an operation input unit 10, and the like are provided in a state where a driver as the occupant takes a seat 2b.

The steering unit 4 is, for example, a steering wheel protruding from a dashboard. The acceleration operation unit 5 is, for example, an accelerator pedal positioned under the foot of the driver. The braking operation unit 6 is, for example, a brake pedal positioned under the foot of the driver. The transmission operation unit 7 is, for example, a shift lever protruding from a center console.

The monitor device 11 is provided, for example, on the central portion of the dashboard in the vehicle width direction (i.e., in the transverse direction). The monitor device 11 may have a function of, for example, a navigation system or an audio system. The monitor device 11 includes the display device 8, the sound output device 9, and the operation input unit 10. In addition, the monitor device 11 may include various operation input units such as a switch, a dial, a joystick, and a push button.

The display device 8 may be configured with a liquid crystal display (LCD) or organic electroluminescent display (OLED), or the like, and may display various images based on image data. The sound output device 9 is configured with a speaker, or the like, and outputs various sounds based on sound data. The sound output device 9 may be provided at a different position other than the monitor device 11 inside the vehicle room 2a.

The operation input unit 10 is configured with a touch panel, or the like, and enables various pieces of information to be input by the occupant. In addition, the operation input unit 10 is provided on a display screen of the display device 8, and is capable of transmitting an image displayed on the display device 8. Thus, the operation input unit 10 allows the occupant to visually recognize the image displayed on the display screen of the display device 8. The operation input unit 10 receives the input of various pieces of information by the occupant by detecting a touch operation by the occupant on the display screen of the display device 8.

Figure 2:
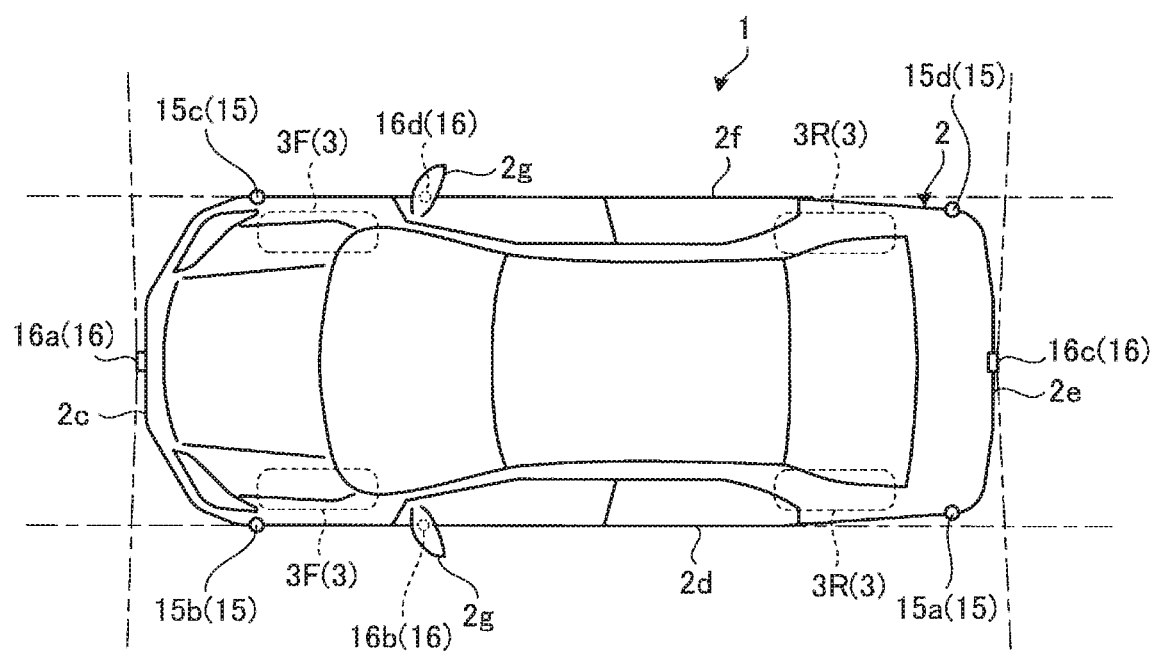
FIG. 2 is a plan view of an example of the vehicle according to the first embodiment.

FIG. 2 is a plan view of an example of the vehicle according to the first embodiment. As illustrated in FIGS. 1 and 2, the vehicle 1 is a four-wheeled automobile or the like, and includes two left and right front wheels 3F and two left and right rear wheels 3R. Some or all of the four wheels 3 may be steered.

The vehicle 1 includes a plurality of imaging units 16. Each imaging unit 16 is a digital camera having an imaging element such as a charge coupled device (CCD) or a CMOS image sensor (CIS). The imaging unit 16 may capture an image of the surroundings of the vehicle 1 at a predetermined frame rate. Then, the imaging unit 16 outputs image data of the captured image obtained by imaging the surroundings of the vehicle 1.

In the present embodiment, the imaging units 16 include four imaging units 16a to 16d. The imaging unit 16a is located at a front end 2c of the vehicle body 2 and is installed on a front bumper or the like. The imaging unit 16b is located at a left end 2d of the vehicle body 2 and is installed on a left side mirror 2g or the like. The imaging unit 16c is located at a rear end 2e of the vehicle body 2 and is installed on a rear trunk door 2h or the like. The imaging unit 16d is located at a right end 2f of the vehicle body 2 and is installed on a right side mirror 2g.

The vehicle 1 includes a plurality of distance measurement sensors 15 (15a to 15d). The distance measurement sensors 15 emit light such as laser light, and receive the light reflected by an obstacle such as another vehicle present around the vehicle 1. Then, the distance measurement sensors 15 transmit distance information, which enables the distance from the vehicle 1 to the obstacle to be specified, to an ECU 24 based on the result of receiving the light from the obstacle. The distance measurement sensors 15 may transmit the distance from the vehicle 1 to the obstacle, as the distance information, to the ECU 24, or may transmit the time at which the light is emitted from the distance measurement sensors 15 and the time at which the distance measurement sensors 15 receive the light, as the distance information, to the ECU 24.

Figure 3:
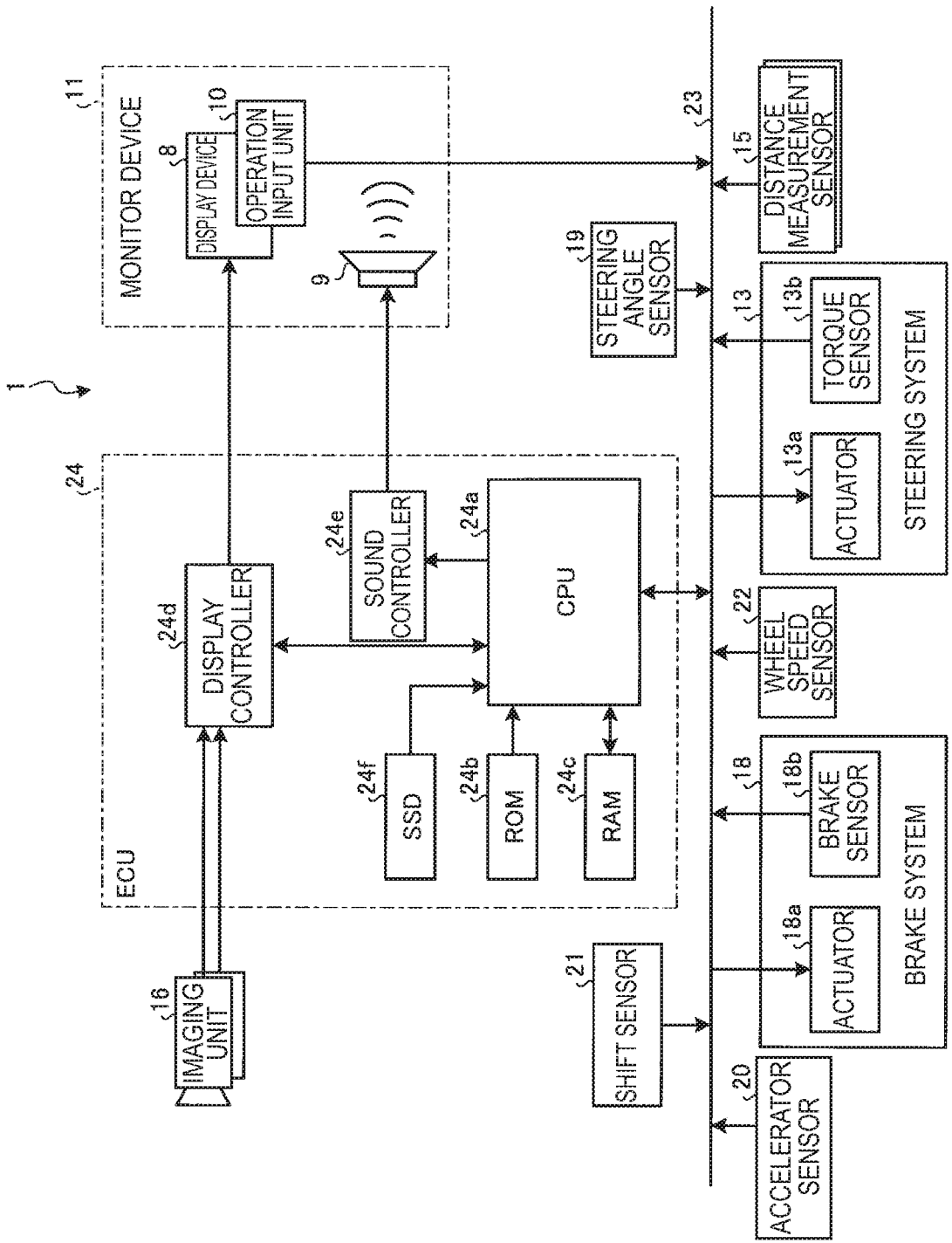
FIG. 3 is a block diagram illustrating an example of a functional configuration of the vehicle according to the first embodiment.

FIG. 3 is a block diagram illustrating an example of a functional configuration of the vehicle according to the first embodiment. As illustrated in FIG. 3, the vehicle 1 includes a steering system 13, a brake system 18, a steering angle sensor 19, an accelerator sensor 20, a shift sensor 21, a wheel speed sensor 22, an in-vehicle network 23, and the electronic control unit (ECU) 24.

The monitor device 11, the steering system 13, the distance measurement sensors 15, the brake system 18, the steering angle sensor 19, the accelerator sensor 20, the shift sensor 21, the wheel speed sensor 22, and the ECU 24 are electrically connected to each other via the in-vehicle network 23, which is an electric communication line. The in-vehicle network 23 is configured with a controller area network (CAN) or the like.

The steering system 13 is an electric power steering system, a steer by wire (SBW) system, or the like. The steering system 13 includes an actuator 13a and a torque sensor 13b. In addition, the steering system 13 is electrically controlled by the ECU 24 or the like, and operates the actuator 13a to apply a torque to the steering unit 4 so as to supplement a steering force, thereby steering the wheels 3. The torque sensor 13b detects the torque that the driver gives to the steering unit 4, and transmits the detection result to the ECU 24.

The brake system 18 includes an anti-lock brake system (ABS), which suppresses the lock of a brake of the vehicle 1, an electronic stability control (ESC) device, which suppresses the side slip of the vehicle 1 during cornering, an electric brake system, which assists the brake by increasing a brake force, and a brake by wire (BBW). The brake system 18 includes an actuator 18a and a brake sensor 18b. The brake system 18 is electrically controlled by the ECU 24 or the like, and gives a braking force to the wheels 3 via the actuator 18a. The brake system 18 detects the lock of the brake, the idling of the wheels 3, signs of the side slip, and the like from a difference in the rotation of the right and left wheels 3 and the like, thereby executing control to suppress the lock of the brake, the idling of the wheels 3, and the side slip. The brake sensor 18b is a displacement sensor, which detects the position of the brake pedal as a movable part of the brake operation unit 6, and transmits the detection result of the position of the brake pedal to the ECU 24.

The steering angle sensor 19 is a sensor that detects the amount of steering of the steering unit 4 such as the steering wheel. In the present embodiment, the steering angle sensor 19 is configured with a Hall element or the like, detects the rotation angle of a rotating part of the steering unit 4 as the amount of steering, and transmits the detection result to the ECU 24. The accelerator sensor 20 is a displacement sensor, which detects the position of an accelerator pedal as a movable part of the acceleration operation unit 5, and transmits the detection result to the ECU 24.

The shift sensor 21 is a sensor that detects the position of a movable part (bar, arm, button, etc.) of the transmission operation unit 7, and transmits the detection result to the ECU 24. The wheel speed sensor 22 includes a Hall element or the like, and is a sensor that detects the amount of rotation of the wheels 3 or the number of revolutions per unit time of the wheels 3, and transmits the detection result to the ECU 24.

The ECU 24 is an example of the vehicle traveling assistance apparatus, which controls the steering system 13, the brake system 18, and the transmission operation unit 7 via the in-vehicle network 23, thereby controlling the driving of the vehicle 1, for example, when parking the vehicle 1 at a parking position. The ECU 24 is configured with a computer or the like. Specifically, the ECU 24 includes a central processing unit (CPU) 24a, a read only memory (ROM) 24b, a random access memory (RAM) 24c, a display controller 24d, a sound controller 24e, and a solid state drive (SSD) 24f. The CPU 24a, the ROM 24b, and the RAM 24c may be provided in the same circuit board.

The CPU 24a reads a program stored in a nonvolatile storage device such as the ROM 24b, and executes various calculation processings according to the program. For example, the CPU 24a executes an image processing on image data to be displayed on the display device 8, calculation of a distance to an obstacle present around the vehicle 1, setting of a parking position, calculation of a route of the vehicle 1 to a parking position, control of vehicle driving, and the like.

The ROM 24b stores various programs and parameters and the like required for executing the programs. The RAM 24c temporarily stores various data used in the calculations in the CPU 24a. The display controller 24d mainly executes an image processing on image data, which is acquired from the imaging unit 16 and is output to the CPU 24a, conversion from image data acquired from the CPU 24a to display image data to be displayed on the display device 8, and the like, among the calculation processings in the ECU 24. The sound controller 24e mainly executes a sound processing of acquiring sound from the CPU 24a and outputting the sound to the sound output device 9, among the calculation processings in the ECU 24. The SSD 24f is a rewritable nonvolatile storage unit, and continuously stores data acquired from the CPU 24a even when the ECU 24 is powered off.

In the present embodiment, the ECU 24 is in charge of the overall control of the vehicle 1 via cooperation of hardware and software (control program). For example, the ECU 24 identifies a parking frame or the like, marked on the road surface in the vicinity of the vehicle 1, from a captured image obtained by imaging of the imaging unit 16, sets a parking position inside the parking frame, and controls parking of the vehicle 1 to the parking position. Thus, the ECU 24 implements a function as the vehicle traveling assistance apparatus.

Figure 4:
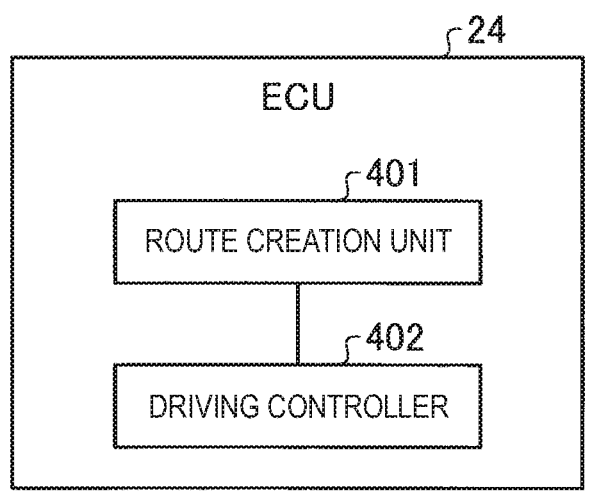
FIG. 4 is a block diagram illustrating an example of a functional configuration of an ECU included in the vehicle according to the first embodiment.

FIG. 4 is a block diagram illustrating an example of a functional configuration of the ECU of the vehicle according to the first embodiment. As illustrated in FIG. 4, the ECU 24 includes a route creation unit 401 and a driving controller 402. For example, the CPU 24a executes a vehicle traveling assistance processing program stored in the ROM 24b or the SSD 24f, thereby implementing the functions of the route creation unit 401 and the driving controller 402. Any or both of the route creation unit 401 and the driving controller 402 may be configured with hardware such as a circuit.

The route creation unit 401 creates a basic route BR, which includes at least one of a clothoid curve and a straight line, and along which the vehicle 1 moves from an initial position (e.g., the position at which control of parking of the vehicle 1 to a parking position starts) to a target position (e.g., a parking position P), which is different from the initial position, without reversing a traveling direction thereof. In addition, the route creation unit 401 creates a new route, along which the vehicle 1 stops to perform stationary steering in the middle of moving from the initial position to the target position, and then moves to the target position. In the present embodiment, the route creation unit 401 creates the basic route BR and the new route based on a captured image obtained by imaging the surroundings of the vehicle 1 by the imaging unit 16, distance information received from the distance measurement sensor 15, and the like. Here, it is assumed that stop of the vehicle 1 when the vehicle 1 performs stationary steering in the new route includes a state where the traveling speed of the vehicle 1 has become an extremely low speed. Thus, it is possible to reduce the load applied to the steering unit 4 and the like when the vehicle 1 performs stationary steering. Here, the extremely low speed is a state where the traveling speed of the vehicle 1 is close to 0, for example, a speed slower than the human walking speed.

The driving controller 402 causes the vehicle 1 to travel along the basic route BR created by the route creation unit 401. Alternatively, the driving controller 402 causes the vehicle 1 to travel along the new route created by the route creation unit 401. In the present embodiment, the driving controller 402 controls the steering unit 4, the braking operation unit 6, and the acceleration operation unit 5, thereby causing the vehicle 1 to travel along the basic route BR or the new route.

In addition, in the present embodiment, the driving controller 402 determines whether or not the vehicle 1 collides with an obstacle when the vehicle 1 travels along the basic route BR based on a captured image output from the imaging unit 16, distance information received from the distance measurement sensor 15, and the like. Here, a case of determining that the vehicle 1 collides with the obstacle includes, in addition to a case where the vehicle 1 collides with the obstacle, a case where the distance between the vehicle 1 and the obstacle is equal to or less than a preset distance. In addition, in the present embodiment, it is assumed that the route creation unit 401 creates the new route in a case where it is determined that the vehicle 1 collides with the obstacle when the vehicle 1 travels along the basic route BR.

In addition, in the present embodiment, the driving controller 402 may create a new route so as to cause the vehicle 1 to travel along the new route even in a case where a change in the curvature (hereinafter referred to as "turning curvature") of a route of the vehicle 1 when causing the vehicle 1 to travel so as to avoid a collision between the vehicle 1 and the obstacle exceeds the upper limit of a change in the turning curvature of a route of the vehicle 1 when causing the vehicle 1 to travel along a clothoid curve. Thus, it is possible to reduce a possibility that the driver of the vehicle 1 feels unnatural due to the fact that it is impossible to move the vehicle 1 to the target position when the movement of the vehicle 1 to the target position is controlled by the ECU 24, despite that the driver of the vehicle 1 may manually move the vehicle 1 to the target position.

Figure 5:
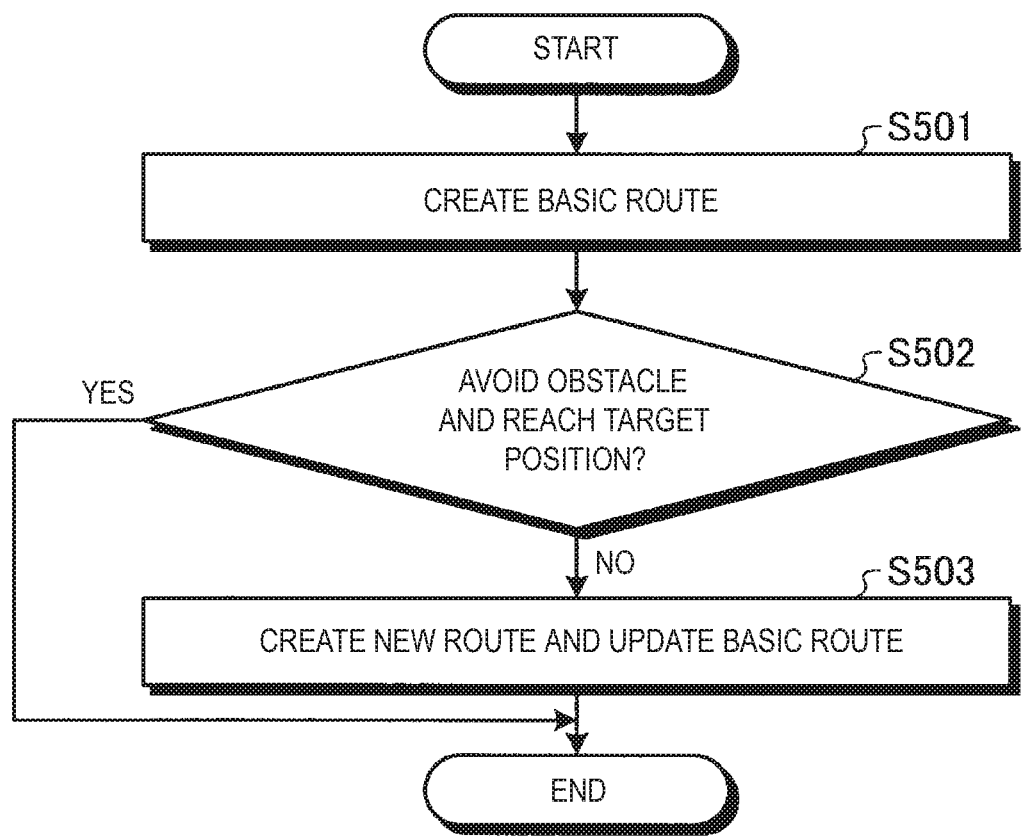
FIG. 5 is a flowchart illustrating an example of the flow of a vehicle traveling assistance processing of the vehicle according to the first embodiment.

Next, an example of the flow of a vehicle traveling assistance processing of the vehicle 1 by the ECU 24 according to the present embodiment will be described with reference to FIG. 5. FIG. 5 is a flowchart illustrating an example of the flow of a vehicle traveling assistance processing of the vehicle according to the first embodiment. In the following description, a processing of controlling parking of the vehicle 1 will be described, but it suffices as long as it controls traveling of the vehicle 1 to a target position.

When information to instruct parking of the vehicle 1 to the parking position P is input via the operation input unit 10, the route creation unit 401 acquires a captured image obtained by imaging the surroundings of the vehicle 1 by the imaging unit 16. Then, the route creation unit 401 sets the parking position P, at which the vehicle 1 is parked, based on the acquired captured image. Subsequently, the route creation unit 401 creates, as the basic route BR, a route from an initial position, which is a current position of the vehicle 1, to a target position, which is a position at which the vehicle 1 reaches until it changes a traveling direction thereof afterwards, based on the acquired captured image, distance information received from the distance measurement sensor 15, and the set parking position P (step S501). At that time, it is assumed that the route creation unit 401 creates, as the basic route BR, a route including at least one of a clothoid curve and a straight line. In addition, in a case of parking the vehicle 1 from the initial position to the parking position P without causing the vehicle 1 to go back and forth, the route creation unit 401 creates, as the basic route BR, a route along which the vehicle 1 moves from the initial position to the parking position P without changing the traveling direction thereof.

Figure 6:
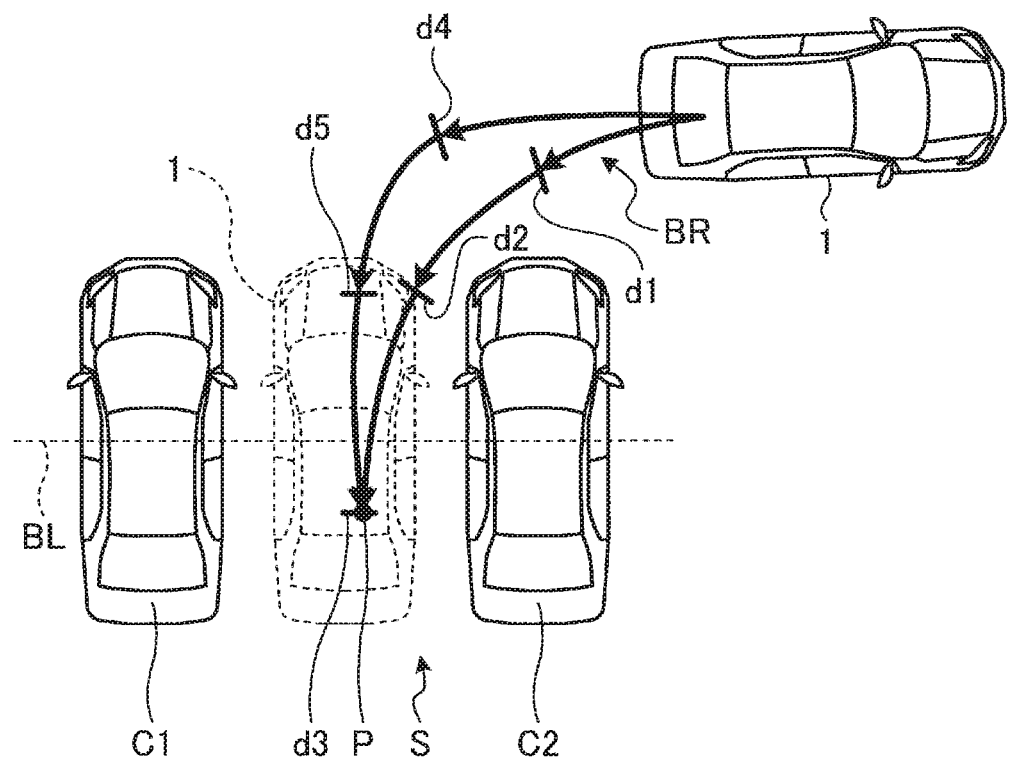
FIG. 6 is a view for explaining an example of a creating processing of a basic route by the vehicle according to the first embodiment.
Figure 7:
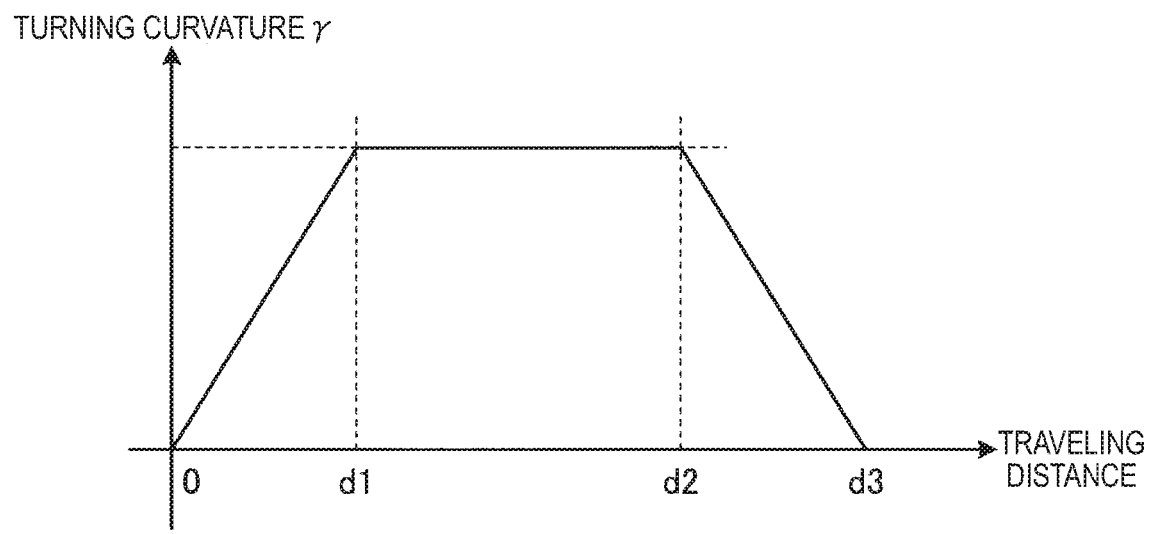
FIG. 7 is a view illustrating an example of a change in the turning curvature of the vehicle when the vehicle according to the first embodiment is parked at a parking position.

FIG. 6 is a view for explaining an example of a basic route creation processing by the vehicle according to the first embodiment. FIG. 7 is a view illustrating an example of a change in the turning curvature of the vehicle when the vehicle according to the first embodiment is parked at the parking position. In FIG. 7, the vertical axis represents the turning curvature of the vehicle 1, and the horizontal axis represents the traveling distance of the vehicle 1 from the initial position to the parking position P. As illustrated in FIG. 6, in a case of parking the vehicle 1 in a space S for perpendicular parking, the route creation unit 401 acquires a captured image obtained by imagining the lateral side of the vehicle 1 by the imaging unit 16 when the vehicle 1 passes in front of a position at which the vehicle 1 enters the space S. Subsequently, the route creation unit 401 specifies positions of other vehicles C1 and C2, which are parked at positions adjacent to the space S, based on the acquired captured image, and sets the parking position P based on the positions of the other vehicles C1 and C2.

Subsequently, as illustrated in FIG. 6, the route creation unit 401 creates the basic route BR including a clothoid curve based on the acquired captured image, distance information received from the distance measurement sensor 15, and the set parking position P. Specifically, the route creation unit 401 sets, in the basic route BR, a route until the traveling distance of the vehicle 1 reaches a distance d1 to a clothoid curve, along which the vehicle 1 is moved while the steering unit 4 is steered. In that case, the turning curvature γ of the vehicle 1 changes as the traveling distance of the vehicle 1 increases, as illustrated in FIG. 7. In addition, the route creation unit 401 sets, in the basic route BR, a route until the traveling distance of the vehicle 1 is changed from the distance d1 to a distance d2 to an arc, along which the vehicle 1 is moved while the steering unit 4 is stationary. In this case, the turning curvature γ of the vehicle 1 is not changed even if the traveling distance of the vehicle 1 increases, as illustrated in FIG. 7. In addition, the route creation unit 401 sets, in the basic route BR, a route until the traveling distance of the vehicle 1 is changed from the distance d2 to a distance d3 to a clothoid curve, along which the vehicle 1 is moved while the steering unit 4 is steered. In this case, the turning curvature γ of the vehicle 1 is changed as the traveling distance of the vehicle 1 increases, as illustrated in FIG. 7.

Returning to FIG. 5, when the basic route BR is created, the driving controller 402 determines whether or not the vehicle 1 collides with an obstacle when the vehicle 1 travels along the basic route BR. In other words, the driving controller 402 determines whether or not the vehicle 1 may reach the target position by avoiding the obstacle when causing the vehicle 1 to travel along the basic route BR (step S502). Then, when it is determined that the vehicle 1 collides with the obstacle when the vehicle 1 travels along the basic route BR (step S502: No), the route creation unit 401 creates a new route, along which the vehicle 1 stops to perform stationary steering in the middle of moving from the initial position to the target position, and then moves to the target position (step S503).

When determining that the vehicle 1 does not collide with the obstacle when the vehicle 1 travels along the basic route BR (step S502: Yes), the driving controller 402 causes the vehicle 1 to travel along the basic route BR. On the other hand, when the new route is created, the driving controller 402 causes the vehicle 1 to travel along the basic route BR, which is updated by the created new route.

Thus, since it is possible to move the vehicle 1 to the target position without causing the vehicle 1 to go back and forth when it is determined that the vehicle 1 collides with the obstacle when the vehicle 1 travels along the basic route BR, the time taken to move the vehicle 1 to the target position may be shortened. In addition, it is possible to reduce a possibility that the driver of the vehicle 1 feels unnatural due to the fact that it is impossible to move the vehicle 1 to the target position when the movement of the vehicle 1 to the target position is controlled by the ECU 24, despite that the driver of the vehicle 1 may manually move the vehicle 1 to the target position.

Here, an example of a creating processing of a new route will be described with reference to FIG. 6. As illustrated in FIG. 6, the route creation unit 401 creates a new route, along which the vehicles performs stationary steering in the middle of a route, along which the vehicle moves from the initial position to the target position, when it is determined that the vehicle 1, which travels along the basic route BR, collides with another vehicle C2 (an example of the obstacle). Specifically, the route creation unit 401 sets a route of the vehicle 1 until the traveling distance of the vehicle 1 reaches a distance d4 to a straight line or a clothoid curve. Then, as illustrated in FIG. 6, the route creation unit 401 sets a route, along which the vehicle 1 performs stationary steering in a stop state at the time at which the traveling distance of the vehicle 1 reaches the distance d4, and then the traveling distance of the vehicle 1 is changed from the distance d4 to a distance d5, to an arc, along which the vehicle 1 is moved while the steering unit 4 is stationary. In addition, as illustrated in FIG. 6, the route creation unit 401 sets a route, along which the vehicle 1 performs stationary steering in a stop state at the time at which the traveling distance of the vehicle 1 reaches the distance d5, and then the traveling distance of the vehicle 1 is changed from the distance d5 to the distance d3, to a straight line or clothoid curve.

Thus, since it is possible to move the vehicle 1 to the parking position P without performing stationary steering in a case where a possibility that the vehicle 1 collides with the other vehicle C2 in the middle of moving the vehicle 1 from the initial position to the parking position P along the basic route BR is increased, the time taken to move the vehicle 1 to the parking position P may be shortened. In addition, it is possible to reduce a possibility that the driver of the vehicle 1 feels unnatural due to the fact that it is impossible to move the vehicle 1 to the parking position P when the movement of the vehicle 1 to the parking position P is controlled by the ECU 24, despite that the driver of the vehicle 1 may manually move the vehicle 1 to the parking position P.

Figure 8:
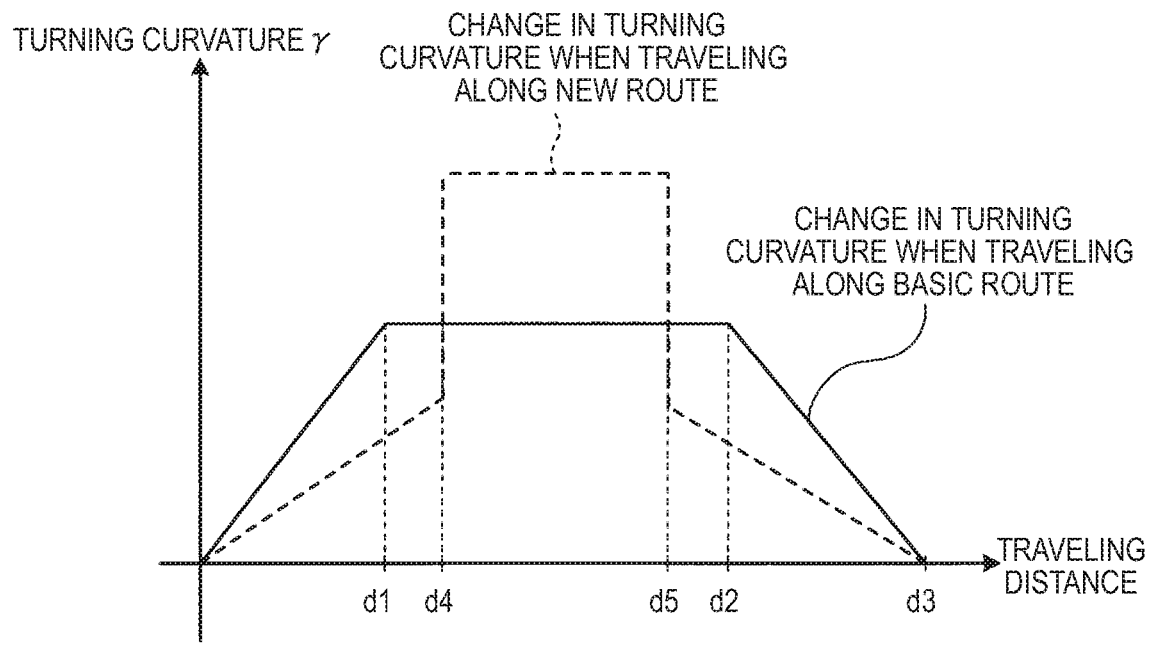
FIG. 8 is a view illustrating an example of a change in the turning curvature when the vehicle according to the first embodiment is parked at the parking position.
Figure 9:
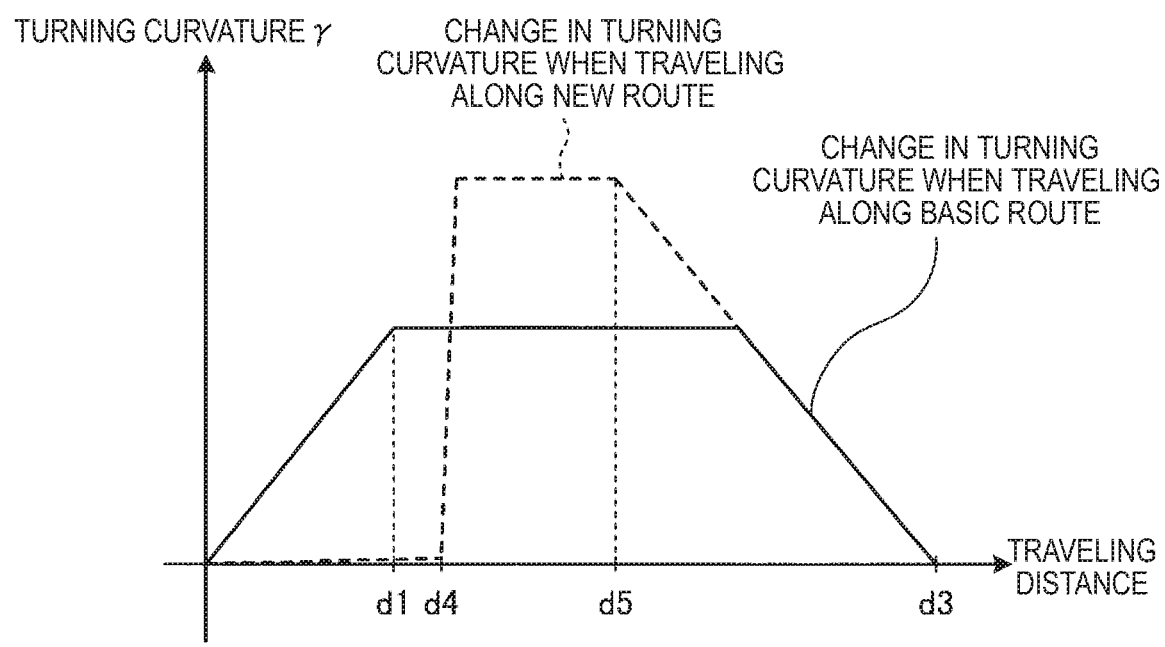
FIG. 9 is a view illustrating an example of a change in the turning curvature when the vehicle according to the first embodiment is parked at the parking position.
Figure 10:
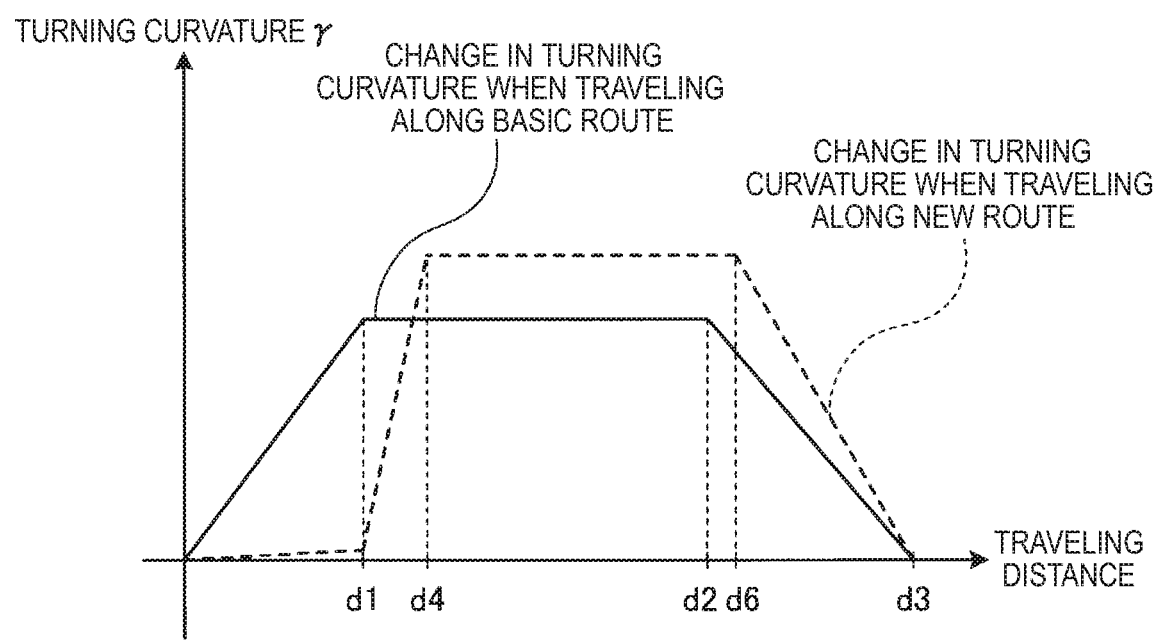
FIG. 10 is a view illustrating an example of a change in the turning curvature when the vehicle according to the first embodiment is parked at the parking position.

Next, an example of a processing of updating the basic route BR by the vehicle 1 according to the present embodiment will be described with reference to FIGS. 8 to 10. FIGS. 8 to 10 are views illustrating an example of a change in the turning curvature when the vehicle according to the first embodiment is parked at the parking position. In FIGS.

8 to 10, the vertical axis represents the turning curvature γ of the vehicle 1, and the horizontal axis represents the traveling distance of the vehicle 1 from the initial position to the parking position P.

For example, when it is determined that the vehicle 1 collides with an obstacle when the vehicle 1 is caused to travel along the basic route BR, the route creation unit 401 creates a new route. Specifically, as illustrated in FIG. 8, the route creation unit 401 sets a route until the traveling distance of the vehicle 1 reaches the distance d4 to a clothoid curve, which has a smaller change in turning curvature than the basic route BR. In addition, as illustrated in FIG. 8, the route creation unit 401 sets a route, along which the vehicle 1 performs stationary steering in a stop state at the time at which the traveling distance of the vehicle 1 reaches the distance d4, and then the traveling distance of the vehicle 1 is changed from the distance d4 to the distance d5, to an arc, along which the vehicle 1 is moved while the steering unit 4 is stationary. In addition, as illustrated in FIG. 8, the route creation unit 401 sets a route, along which the vehicle 1 performs stationary steering in a stop state at the time at which the traveling distance of the vehicle 1 reaches the distance d5, and then the traveling distance of the vehicle 1 is changed from the distance d5 to the distance d3, to a clothoid curve, which has a smaller change in turning curvature than the basic route BR.

As described above, the route creation unit 401 sets, in the new route, a route until the traveling distance of the vehicle 1 reaches the distance d4 to a route, along which the vehicle 1 avoids the other vehicle C2 with a gentle steering angle, and then stops to perform stationary steering and turns suddenly. Then, the route creation unit 401 updates the basic route BR with the created new route.

Alternatively, when an obstacle, which collides with a vehicle traveling along the basic route BR, is detected, as illustrated in FIG. 9, the route creation unit 401 sets a route until the traveling distance of the vehicle 1 reaches the distance d4 to a straight line. In addition, as illustrated in FIG. 9, the route creation unit 401 sets a route, along which the vehicle 1 performs stationary steering in a stop state at the time at which the traveling distance of the vehicle 1 reaches the distance d4 and then the traveling distance of the vehicle 1 is changed from the distance d4 to the distance d5, to an arc, along which the vehicle 1 is moved while the steering unit 4 is stationary. In addition, as illustrated in FIG. 9, the route creation unit 401 sets a route until the traveling distance of the vehicle 1 is changed from the distance d5 to the distance d3 to a clothoid curve, along which the vehicle 1 is moved while the steering unit 4 is steered.

As described above, the route creation unit 401 sets, in the new route, a route until the traveling distance of the vehicle 1 reaches the distance d4 to a straight line so as to avoid the other vehicle C2, and thereafter creates, as a new route, a route along which the vehicle 1 stops to perform stationary steering and turns suddenly. Then, the route creation unit 401 updates the basic route BR with the created new route.

Alternatively, when an obstacle, which collides with the vehicle 1 traveling along the basic route BR, is detected, as illustrated in FIG. 10, the route creation unit 401 sets a route until the traveling distance of the vehicle 1 reaches the distance d1 to a straight line. In addition, as illustrated in FIG. 10, the route creation unit 401 sets a route, along which the vehicle 1 performs stationary steering in an extremely low speed state at the time at which the traveling distance of the vehicle 1 reaches the distance d1, and then the traveling distance of the vehicle 1 is changed from the distance d4 to the distance d6, to an arc, along which the vehicle 1 is moved while the steering unit 4 is stationary. In addition, as illustrated in FIG. 10, the route creation unit 401 sets a route until the traveling distance of the vehicle 1 is changed from the distance d6 to the distance d3 to a clothoid curve, along which the vehicle 1 is moved while the steering unit 4 is steered.

As described above, the route creation unit 401 sets, in the new route, a route until the traveling distance of the vehicle 1 reaches the distance d1 to a straight line so as to avoid the other vehicle C2, and thereafter sets a route, along which the vehicle 1 performs stationary steering in an extremely low speed state and then turns suddenly. Then, the route creation unit 401 updates the basic route BR with the created new route.

As described above, with the vehicle 1 according to the first embodiment, since it is possible to move the vehicle 1 to the target position without causing the vehicle 1 to go back and forth when it is determined that the vehicle 1 collides with the obstacle when the vehicle 1 moves from the initial position to the target position along the basic route BR, the time taken to move the vehicle 1 to the target position may be shortened.

Second Embodiment

The present embodiment is an example of re-creating a new route when an obstacle, which collides with the vehicle, is detected after the vehicle starts traveling along the basic route. In the following description, a description related to the same configuration as that of the first embodiment will be omitted.

In the present embodiment, after the vehicle 1 starts traveling along the basic route BR, the driving controller 402 detects an obstacle, which collides with the vehicle 1, based on a captured image output from the imaging unit 16, distance information received from the distance measurement sensor 15, and the like. Here, a case of detecting a collision between the vehicle 1 and the obstacle includes, in addition to a case where the vehicle 1 collides with the obstacle, a case where the distance between the vehicle 1 and the obstacle is equal to or less than a preset distance.

Then, when the obstacle, which collides with the vehicle 1, is detected, the route creation unit 401 re-creates a new route, along which the vehicle 1 stops to perform stationary steering in the middle of the basic route BR and then moves to the target position. At that time, the route creation unit 401 re-creates, as the new route, a route along which the vehicle 1 stops to perform stationary steering so as to avoid the detected obstacle and then to move to the target position. Then, the driving controller 402 causes the vehicle 1 to travel along the new route. Thus, since it is possible to move the vehicle 1 to the target position without causing the vehicle 1 to go back and forth in a case where a possibility that the vehicle 1 collides with the obstacle in the middle of moving from the initial position to the target position along the basic route BR is increased, the time taken to move the vehicle 1 to the target position may be shortened. In addition, it is possible to reduce a possibility that the driver of the vehicle 1 feels unnatural due to the fact that it is impossible to move the vehicle 1 to the target position when the movement of the vehicle 1 to the target position is controlled by the ECU 24, despite that the driver of the vehicle 1 may manually move the vehicle 1 to the target position.

Figure 11:
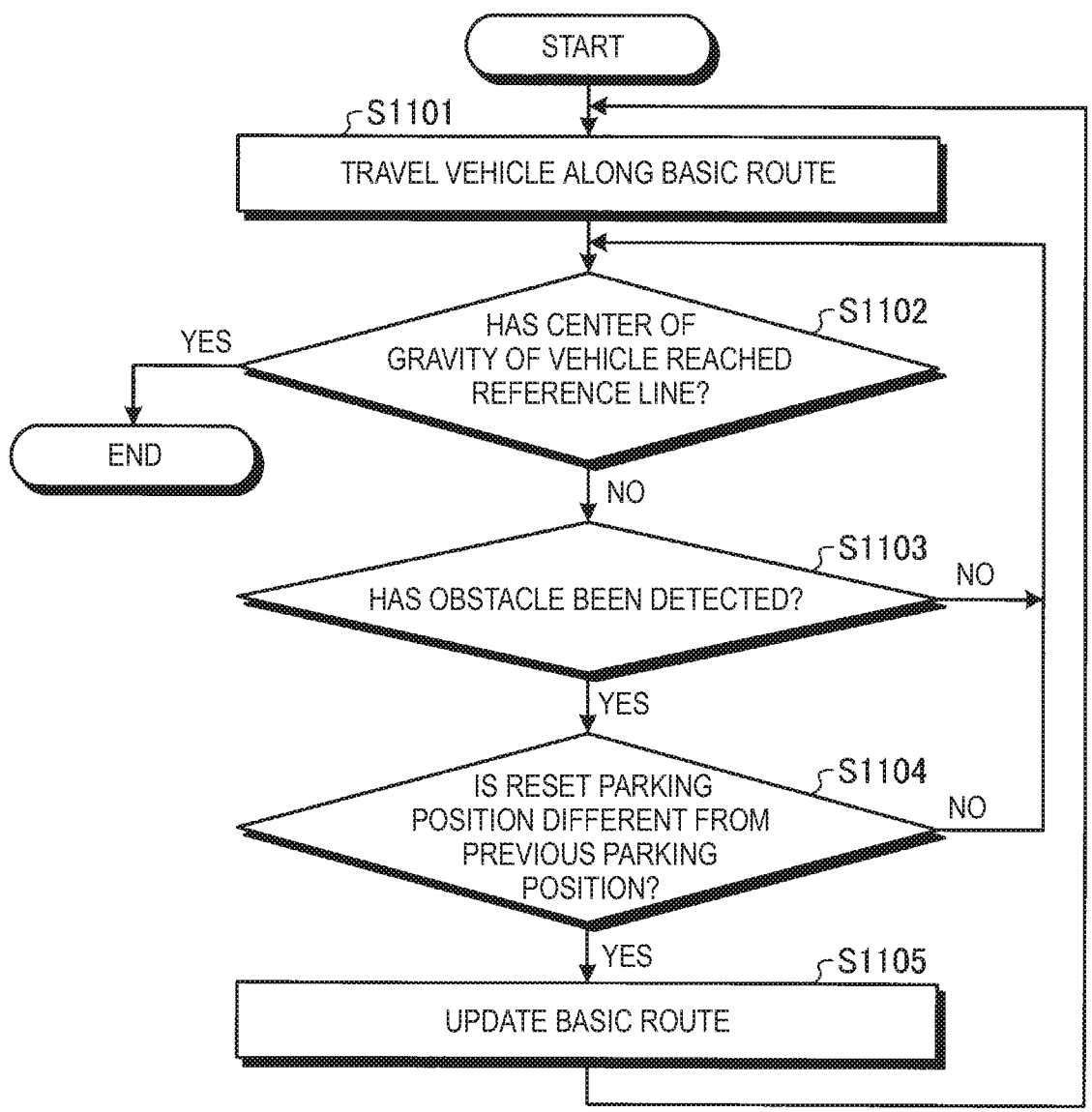
FIG. 11 is a flowchart illustrating an example of the flow of a vehicle traveling assistance processing of a vehicle according to a second embodiment.

Next, an example of the flow of a vehicle traveling assistance processing of the vehicle 1 by the ECU 24 according to the present embodiment will be described with reference to FIG. 11. FIG. 11 is a flowchart illustrating an example of the flow of a vehicle traveling assistance processing of the vehicle according to a second embodiment. In the following explanation, a processing of controlling the parking of the vehicle 1 will be described, but it suffices as long as it controls the traveling of the vehicle 1 to the target position.

When information to instruct parking of the vehicle 1 to the parking position P is input via the operation input unit 10, the route creation unit 401 acquires a captured image obtained by imaging the surroundings of the vehicle 1 by the imaging unit 16. Then, the route creation unit 401 sets the parking position P at which the vehicle 1 is parked based on the acquired captured image. Subsequently, the route creation unit 401 creates, as the basic route BR, a route from an initial position, which is a current position of the vehicle 1, to a target position, which is a position at which the vehicle 1 reaches until it changes the traveling direction thereof afterwards, based on the acquired captured image, distance information received from the distance measurement sensor 15, and the set parking position P. At that time, it is assumed that the route creation unit 401 creates, as the basic route BR, a route including at least one of a clothoid curve and a straight line. In addition, in a case of parking the vehicle 1 without causing the vehicle 1 to go back and forth from the initial position to the parking position P, the route creation unit 401 creates, as the basic route BR, a route along which the vehicle 1 moves from the initial position to the parking position P without changing the traveling direction thereof.

The driving controller 402 controls the steering unit 4, the braking operation unit 6, and the acceleration operation unit 5 according to the basic route BR created by the route creation unit 401, thereby causing the vehicle 1 to travel along the basic route BR created by the route creation unit 401 (step S1101). Subsequently, after the traveling of the vehicle 1 starts along the basic route BR, the driving controller 402 determines whether or not the center of gravity of the vehicle 1 has reached a reference line BL (see FIG. 6) (step S1102). Here, as illustrated in FIG. 6, the reference line BL is set at a position spaced apart from the parking position P by a preset distance in a direction opposite to the traveling direction of the vehicle 1.

Then, when determining that the center of gravity of the vehicle 1 has reached the reference line BL (step S1102: Yes), the driving controller 402 ends creation of a new route. That is, the driving controller 402 permits re-creation of a new route until the center of gravity of the vehicle 1 reaches the reference line BL. Thus, when the vehicle 1 reaches the reference line BL, it is possible to reduce the load of a calculation processing caused by recreation of a new route. Thereafter, when the vehicle 1 reaches the parking position P, the driving controller 402 ends the traveling of the vehicle 1 from the initial position to the parking position P.

On the other hand, when the center of gravity of the vehicle 1 has not reached the reference line BL (step S1102: No), the driving controller 402 starts a processing of detecting an obstacle, which collides with the vehicle 1, based on a captured image output from the imaging unit 16, distance information received from the distance measurement sensor 15, and the like after the traveling of the vehicle 1 starts along the basic route.

When the obstacle, which collides with the vehicle 1, is detected (step S1103: Yes), the route creation unit 401 determines whether or not the re-set parking position P is different from the previous parking position P in the middle of the basic route BR (step S1104). In the present embodiment, it is assumed that the route creation unit 401 re-sets the parking position P based on the acquired captured image even after the vehicle 1 starts traveling along the basic route BR. Thus, in a case where the vehicle 1 approaches the space S and it becomes possible to more accurately set the parking position P, it is possible to reduce a possibility that the vehicle 1 is parked at a position deviated from the parking position P because the parking position P is reset and the basic route BR or the new route is created based on the accurate parking position P.

Then, when the obstacle, which collides with the vehicle 1, is detected and the reset parking position P is different from the previous parking position P (step S1104: Yes), the route creation unit 401 re-creates a new route, along which the vehicle 1 stops to perform stationary steering in the middle of the basic route BR, and updates the basic route BR with the new route (step S1105). Then, the driving controller 402 causes the vehicle 1 to travel along the basic route BR updated by the new route. Thereafter, the ECU 24 repeats the processing illustrated in step S1101 and steps S1103 to S1105 until it is determined that the center of gravity of the vehicle 1 has reached the reference line BL. That is, the route creation unit 401 permits re-creation of a new route until the center of gravity of the vehicle 1 reaches the reference line BL. Thus, when the vehicle 1 reaches the reference line BL, it is possible to reduce the load of a calculation processing caused by the updating of the basic route BR. Thereafter, when the vehicle 1 reaches the parking position P, the driving controller 402 ends the traveling of the vehicle 1 from the initial position to the parking position P.

As described above, with the vehicle 1 according to the second embodiment, since it is possible to move the vehicle 1 to the target position without causing the vehicle 1 to go back and forth in a case where a possibility that the vehicle 1 collides with an obstacle in the middle of moving from the initial position to the target position along the basic route BR is increased, the time taken to move the vehicle 1 to the target position may be shortened.

In the present embodiment, although the route creation unit 401 re-creates a new route when the obstacle, which collides with the vehicle 1, is detected after the vehicle 1 starts traveling along the basic route BR, and updates the basic route BR with the new route, when the target position is the parking position P, the route creation unit 401 may create, in addition to the basic route BR, a route (hereinafter referred to as a stationary steering route), along which the vehicle 1 stops to perform stationary steering in the middle of moving from the initial position to the parking position P, and then moves to the parking position P before the traveling of the vehicle 1 to the parking position P starts.

Then, in a case where the vehicle 1 may reach the parking position P without going back and forth when causing the vehicle 1 to travel along the stationary steering route, the driving controller 402 causes the vehicle 1 to travel along the stationary steering route. On the other hand, in a case where it is necessary to cause the vehicle 1 to go back and forth even when causing the vehicle 1 to travel along the stationary steering route, the driving controller 402 causes the vehicle 1 to travel along the basic route BR. Thus, since it is possible to park the vehicle 1 at the parking position P along the stationary steering path in a case where it is possible to park the vehicle to the parking position P without causing the vehicle 1 to go back and forth by performing stationary steering operation in the middle of a route along which the vehicle 1 moves from the initial position to the parking position P, the time taken to move the vehicle to the parking position P may be shortened.

In one example, a vehicle traveling assistance apparatus of an embodiment includes a creation unit configured to create a first route, which is a route along which a vehicle moves from an initial position to a parking position and in which the vehicle stops to perform stationary steering in a middle of the route and then moves to the parking position, and a second route, which includes at least one of a clothoid curve and a straight line and along which the vehicle moves from the initial position to the parking position, and a controller configured to cause the vehicle to travel along the first route in a case where the vehicle is able to reach the parking position without going back and forth when causing the vehicle to travel along the first route, and to cause the vehicle to travel along the second route in a case where the vehicle is required to go back and forth when causing the vehicle to travel along the first route. Thus, in one example, it is possible to shorten the time taken to move the vehicle to the parking position.

In addition, a program executed in the vehicle 1 of the present embodiment is embedded in advance in the ROM 24b or the like, but may be recorded as a file in an installable format or executable format in a computer readable recording medium such as a CD-ROM, a flexible disk (FD), a CD-R, or a digital versatile disk (DVD).

In addition, the program executed in the vehicle 1 of the present embodiment may be stored in a computer, which is connected to a network such as the Internet, and be downloaded via the network. In addition, the program executed in the vehicle 1 of the present embodiment may be provided or distributed via a network such as the Internet.

The program executed in the vehicle 1 of the present embodiment has a module configuration including each of the above-described units (the route creation unit 401 and the driving controller 402), and as an actual hardware, the CPU 24a may read and execute a program from the ROM 24b, so that the above respective units are loaded on a main storage device and the route creation unit 401 and the driving controller 402 are generated on the main storage device.

In one example, a vehicle traveling assistance apparatus of an embodiment includes a creation unit configured to create a first route, which is a route along which a vehicle moves from a first position to a second position and in which the vehicle stops to perform stationary steering in a middle of the route and then moves to the second position, and a controller configured to cause the vehicle to travel along the created first route. Thus, in one example, it is possible to shorten the time taken to move the vehicle to a target position.

In one example, in the vehicle traveling assistance apparatus of the embodiment, the creation unit may create a second route, which includes at least one of a clothoid curve and a straight line, and along which the vehicle moves from the first position to the second position without reversing a traveling direction thereof, and the controller may cause the vehicle to travel along the second route, and when detecting an obstacle which collides with the vehicle after the vehicle starts traveling along the second route, the controller may cause the vehicle to travel along the first route. Thus, in one example, it is possible to shorten the time taken to move the vehicle to the target position.

In one example, in the vehicle traveling assistance apparatus, the controller may cause the vehicle to travel along the first route in a case where a change in a curvature of a route of the vehicle when causing the vehicle to travel so as to avoid a collision between the vehicle and the obstacle exceeds an upper limit of a change in a curvature of a route of the vehicle when causing the vehicle to travel along the clothoid curve. Thus, in one example, it is possible to reduce a possibility that a driver of the vehicle feels unnatural due to the fact that it is impossible to move the vehicle to the target position when the movement of the vehicle to the target position is controlled.

In one example, in the vehicle traveling assistance apparatus, stop of the vehicle when the vehicle performs stationary steering in the first route may include a state where a traveling speed of the vehicle has become an extremely low speed. Thus, in one example, it is possible to reduce the load applied to a steering unit or the like when the vehicle performs stationary steering.

In one example, in the vehicle traveling assistance apparatus, the creation unit may re-create the first route when detecting the obstacle which collides with the vehicle after the vehicle starts traveling along the second route, and, when the second position is a parking position of the vehicle, the controller may set a reference line at a position spaced apart from the parking position by a predetermined distance in a direction opposite to the traveling direction of the vehicle, and may permit re-creation of the first route until a center of gravity of the vehicle reaches the reference line. Thus, in one example, when the center of gravity of the vehicle has reached the reference line, it is possible to reduce the load of a calculation processing caused by the creation of the route.

In one example, in the vehicle traveling assistance apparatus, the creation unit may create a second route, which includes at least one of the clothoid curve and the straight line, and along which the vehicle moves from the first position to the second position, and the controller may cause the vehicle to travel along the first route in a case where the vehicle is able to reach the parking position without going back and forth when causing the vehicle to travel along the first route, and in a case where the vehicle is required to go back and forth when causing the vehicle to travel along the first route, the controller may cause the vehicle to travel along the second route. Thus, in one example, it is possible to shorten the time taken to move the vehicle to the parking position.

Although the embodiments disclosed here have been described, the embodiments are presented by way of example and are not intended to limit the scope of this disclosure. These novel embodiments may be implemented in various other forms, and various omissions, substitutions, and changes may be made without departing from the gist of this disclosure. These embodiments are included in the scope or gist of this disclosure, and are included in the equivalent scope of the disclosure described in the claims.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle traveling assistance apparatus comprising:
   a processor configured to implement a creation unit configured to create a first route, which is a route along which a vehicle moves from a first position to a second position and in which the vehicle stops to perform stationary steering in a middle of the route and then moves to the second position; and a controller configured to cause the vehicle to travel along the first route, wherein the second position is a target position in a space for perpendicular parking, and the first route includes a first point at which a first stationary steering is performed and a second point at which a second stationary steering is performed, the second stationary steering being performed after the first stationary steering, wherein a curvature of the first route extending between the second point and the second position has a curvature of a same orientation, but with a smaller curvature radius than a curvature radius between the first point and the second point.

2. The apparatus according to claim 1, wherein the creation unit creates a second route, which includes at least one of a clothoid curve and a straight line, and along which the vehicle moves from the first position to the second position without reversing a traveling direction thereof, and the controller causes the vehicle to travel along the second route, and when detecting an obstacle which collides with the vehicle after the vehicle starts traveling along the second route, the controller causes the vehicle to travel along the first route.

3. The apparatus according to claim 2, wherein the controller causes the vehicle to travel along the first route in a case where a change in a curvature of a route of the vehicle when causing the vehicle to travel so as to avoid a collision between the vehicle and the obstacle exceeds an upper limit of a change in a curvature of a route of the vehicle when causing the vehicle to travel along the clothoid curve.

4. The apparatus according to claim 3, wherein stop of the vehicle when the vehicle performs stationary steering in the first route includes a state where a traveling speed of the vehicle has become an extremely low speed.

5. The apparatus according to claim 2, wherein stop of the vehicle when the vehicle performs stationary steering in the first route includes a state where a traveling speed of the vehicle has become an extremely low speed.

6. The apparatus according to claim 2, wherein the creation unit re-creates the first route when detecting the obstacle which collides with the vehicle after the vehicle starts traveling along the second route, and the controller sets a reference line at a position spaced apart from the second position by a predetermined distance in a direction opposite to a final traveling position of the vehicle, and permits re-creation of the first route until a center of gravity of the vehicle reaches the reference line.

7. The apparatus according to claim 1, wherein the controller causes the vehicle to travel along the first route in a case where a change in a curvature of a route of the vehicle when causing the vehicle to travel so as to avoid a collision between the vehicle and an obstacle exceeds an upper limit of a change in a curvature of a route of the vehicle when causing the vehicle to travel along a clothoid curve.

8. The apparatus according to claim 7, wherein stop of the vehicle when the vehicle performs stationary steering in the first route includes a state where a traveling speed of the vehicle has become an extremely low speed.

9. The apparatus according to claim 1, wherein stop of the vehicle when the vehicle performs stationary steering in the first route includes a state where a traveling speed of the vehicle has become an extremely low speed.

10. A vehicle traveling assistance apparatus comprising:

a controller configured to implement a creation unit configured to create a first route, which is a route along which a vehicle moves from an initial position to a parking position and in which the vehicle stops to perform stationary steering in a middle of the route and then moves to the parking position, and a second route, which includes at least one of a clothoid curve and a straight line and along which the vehicle moves from the initial position to the parking position, and the controller is also configured to cause the vehicle to travel along the first route in a case where the vehicle is able to reach the parking position without going back and forth when causing the vehicle to travel along the first route, and to cause the vehicle to travel along the second route in a case where the vehicle is required to go back and forth when causing the vehicle to travel along the first route, wherein the parking position is a target position in a space for perpendicular parking, and the first route includes a first point at which a first stationary steering is performed and a second point at which a second stationary steering is performed, the second stationary steering being performed after the first stationary steering, wherein a curvature of the first route extending between the second point and the parking position has a curvature of a same orientation, but with a smaller curvature radius than a curvature radius between the first point and the second point.

* * * * *